(12) United States Patent
Adams et al.

(10) Patent No.: US 6,610,379 B1
(45) Date of Patent: Aug. 26, 2003

(54) MULTIPLE-USE CONSTRUCTION FOR RFID LABELS

(75) Inventors: Matthew T. Adams, Cincinnati, OH (US); Kevin Girard Conwell, Fairfield, OH (US)

(73) Assignee: Intermec IP Corp., Woodland Hills, CA (US)

( * ) Notice: Subject to any disclaimer, the term of this patent is extended or adjusted under 35 U.S.C. 154(b) by 27 days.

(21) Appl. No.: 09/591,292

(22) Filed: Jun. 9, 2000

(51) Int. Cl.[7] ............................................. G06K 19/077
(52) U.S. Cl. ................... 428/40.1; 235/382.5; 235/488; 235/492; 428/42.1; 428/41.7; 428/41.8; 428/202
(58) Field of Search .............................. 428/40.1, 42.1, 428/41.7, 41.8, 202; 235/492, 488, 382.5

(56) References Cited

U.S. PATENT DOCUMENTS 6,206,292 B1 * 3/2001 Robertz ..................... 235/488
6,281,795 B1 * 8/2001 Smith ...................... 340/572.1

* cited by examiner

Primary Examiner—Nasser Ahmad
(74) Attorney, Agent, or Firm—Orum & Roth

(57) ABSTRACT

A RFID label capable of multiple uses. Multiple layers allow the label to be removed from an object by separation of adhesive which cohesively fails and then, re-application of the label to a new object by revealing a new pressure sensitive adhesive layer. Similarly, printable face sheets may be removed for multiple printings or the face sheet arranged in a manner which allows distinct regions to be printed in sequence with the previous region being overprinted. To allow passage through a printer after removal, separable liners are included so that the pressure sensitive adhesive layer is not exposed until immediately prior to re-affixation to the desired object.

1 Claim, 4 Drawing Sheets

MULTIPLE-USE CONSTRUCTION FOR RFID LABELS

BACKGROUND OF THE INVENTION

This invention is in the field of machine readable labels, specifically RFID labels. To lower the cost of an RFID label, it is desirable to reuse rather than replace them. Previously, once applied to an object, an RFID label was permanently attached. Secondary adhesives have been used to reapply an RFID label that has been removed from its original object. Secondary adhesives, however are messy and unreliable in dirty or cold environments. RFID labels have been provided with new printed indicia by affixing an over label. However, this requires the additional cost and complexity of distributing the overlabel to all potential users, and a smooth, clean surface for proper adhesion. The present invention solves these problems.

SUMMARY OF THE INVENTION

The invention allows an RFID label to be used multiple times, either by removal and reapplication to another object or by removal of the printed indicia upon the label so that it can be changed and modified over time or removed if it has become contaminated or unreadable. Application of secondary adhesives or use of over labels is not required. Removal of the desired portion of the RFID label is facilitated by a release layer. Separation at the release layer reveals a clean adhesive layer or a new printable surface. To allow removal of the RFID label for passage through a printer, liners are built into the label so that the adhesive layer for reattaching the label is not exposed until printing is complete, preventing fouling of the printer by the adhesive.

DETAILED DESCRIPTION OF THE INVENTION

Figure 1:
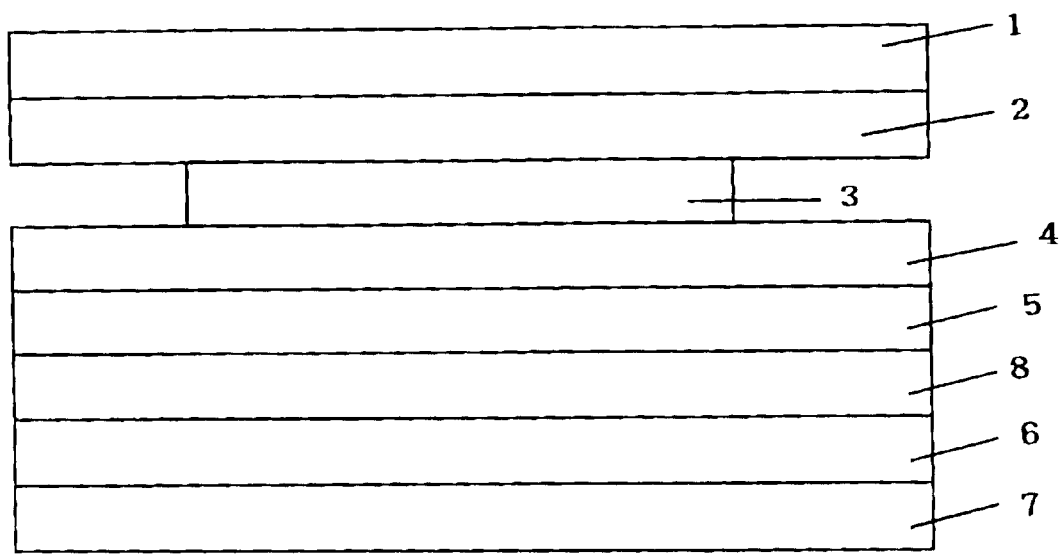
FIG. 1 is a schematic of a side view of a three use label construction.

A first embodiment, as shown in FIG. 1, allows the user to remove the label from one object and immediately attach it to another object. The label construction from top to bottom consists of a printable face sheet (1) upon a first pressure sensitive adhesive layer (2) upon the transponder (3) upon a first release layer (4) upon a second pressure sensitive adhesive layer (5) upon a second release layer (6), a third pressure sensitive adhesive layer (7) and an original liner (8).

For a first use, the original liner (8) is removed and the label placed upon an object, adhering via the third pressure sensitive adhesive layer (7). When pulled by the user, the label will delaminate as a result of an adhesive failure at the release layer closest to the bottom of the label construction, in this case, the second release layer (6). When separated, the second pressure sensitive adhesive layer (5) is exposed, providing a clean adhesive surface to attach the label to the new object. Moving the label from object to object will use up the release layers from bottom to the top until there are none left. FIG. 1, represents a three use label construction, but the number of uses can be increased by adding additional layers.

Figure 2:
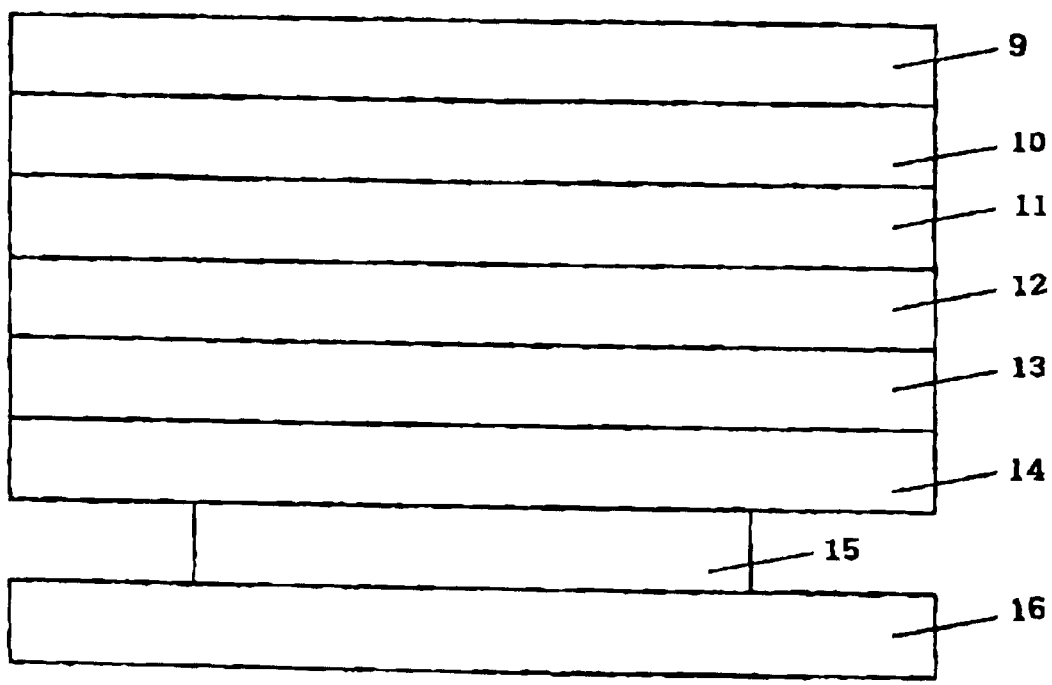
FIG. 2 is a schematic of a side view of a three use label construction.

A second embodiment, shown in FIG. 2, allows the user to remove the top layer of the RFID label through delamination. The delamination results from adhesive failure. This construction provides a way of removing the top layer in the instance that the label is dirty, wet, or otherwise unreadable. 2.45 GHz transponders are adversely effected by the presence of water, a wet label can interfere with the ability of the transponder to be read. Removal of the top layer permits a clean, dry surface to be exposed. From top to bottom, the RFID label is constructed as follows:

An original printable face sheet (9) is placed upon a fourth pressure sensitive adhesive layer (10) which in turn is on top of a third release layer (11) a fifth pressure sensitive adhesive layer (12) a fourth release layer (13) a sixth pressure sensitive adhesive layer (14) a second transponder (15) and finally a second original layer (16).

Separated by the user, the original printable face sheet (9) and fourth pressure sensitive adhesive layer (10) will separate from the label at the third release layer (11). As further face sheets are required either for new printed indicia or due to surface fouling, they are removed in turn. A three use construction is demonstrated in FIG. 2. The number of uses may be increased by adding additional layers.

Figure 3:
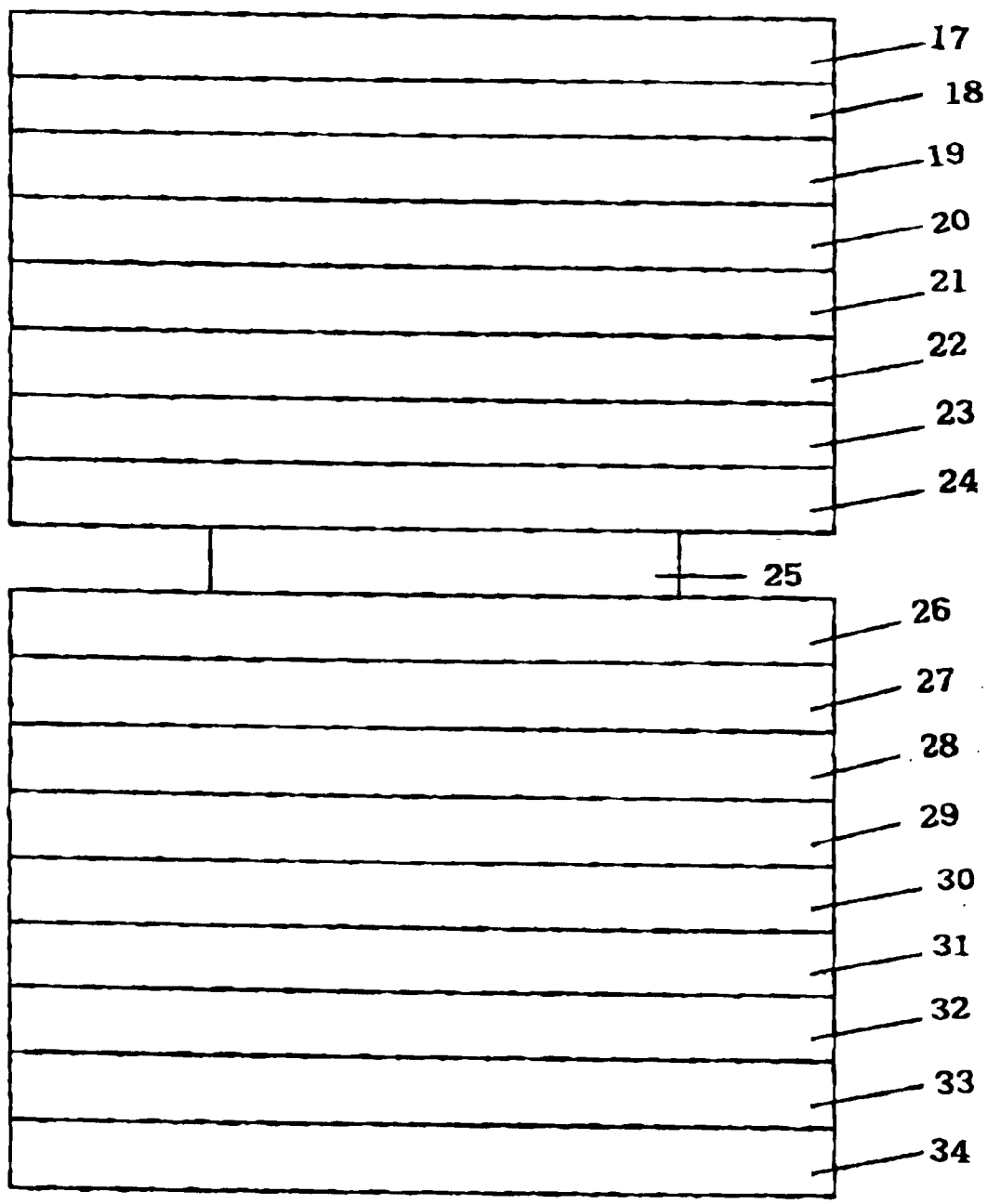
FIG. 3 is a schematic of a side view of a three use label construction.

A third embodiment, as shown in FIG. 3, allows the use of additional printable face sheet layers which are passable through a direct thermal printer. In order to pass each printable face sheet layer through the direct thermal printer, the printer must be protected from the adhesive layers, therefore a liner is provided. The label is removed from the object and successive printable face sheet exposed and the entire label passed through the printer for printing after which the liner is removed allowing re-adhesion to the new object. The label layers from top to bottom in this embodiment are a second printable face sheet (17) upon a seventh pressure sensitive adhesive layer (18) upon a fifth release layer (19) upon a third printable face sheet (20) upon a eighth pressure sensitive adhesive layer (21) upon a sixth release layer (22) upon a fourth printable face sheet (23) upon a ninth pressure sensitive adhesive layer (24) upon a third transponder (25) upon a number one-ply of a two-ply separable layer (26) upon a release layer (27) formed from a non-tack cohesive failure adhesive upon a number two-ply of two-ply separable liner (28) upon a tenth pressure sensitive adhesive layer (29) upon a second number one-ply of two-ply separable layer (30) upon a second release layer (31) formed from a non-tack cohesive failure adhesive upon a second number two-ply of two-ply separable layer (32) upon an eleventh pressure sensitive adhesive layer (33) upon a third original liner (34). In use, the user would separate the label from the object by removal at the second adhesive layer (31) then before passing through the printer, the second printable face sheet (17) and its attached seventh pressure sensitive adhesive layer (13) will be removed at the fifth release layer (19) and the label is passed through the printer and new indicia printed upon a third printable face sheet (20). To affix the label to a new object, the user then removes the second number one-ply of two-ply separable layer (30) revealing a tenth pressure sensitive adhesive layer (29) which will affix the label to the new object. A three use construction is demonstrated, additional uses may be obtained by the addition of additional layers.

Figure 4:
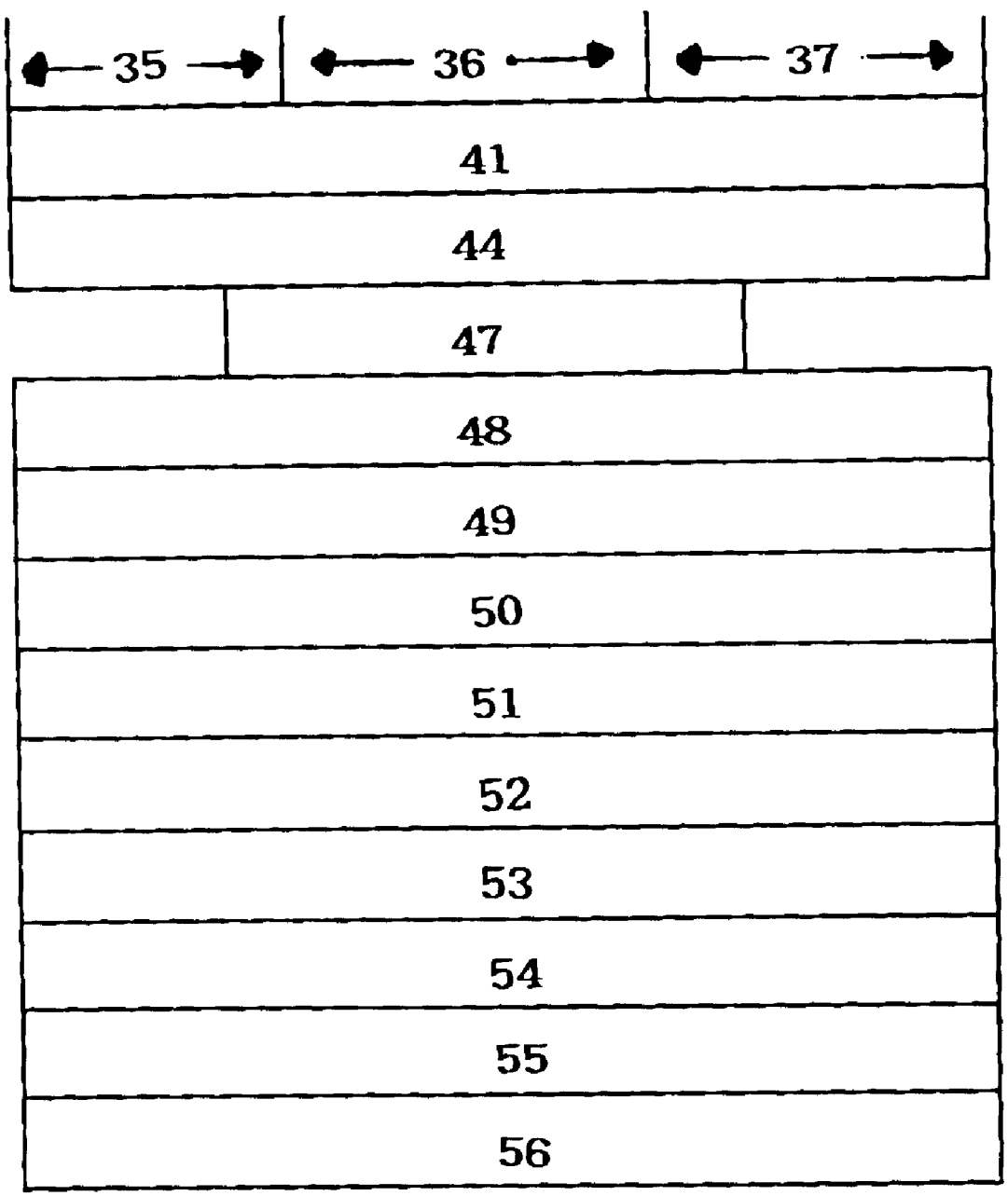
FIG. 4 is a schematic of a side view of a three use label construction.

A fourth embodiment, as shown in FIG. 4, allows for multiple-printable face sheet layers as described in the third embodiment, but allows the previous printed layers to remain in the label for tracking or historical purposes. As demonstrated by FIG. 4, a three use configuration of this embodiment is constructed from top to bottom as follows:

A printable face sheet (41) having three printing regions (35, 36, and 37) placed upon a pressure sensitive adhesive layer (44) and a fourth transponder (47). Next, third number one-ply of two-ply separable layers (48) is upon a third CF adhesive (49) upon third number two-ply of two-ply separable layer (50) upon twelfth pressure sensitive adhesive layer (51) upon fourth number one-ply of two-ply separable layer (52) upon fourth CF adhesive (53) upon fourth number two-ply of two-ply separable layer (54) upon thirteenth pressure sensitive adhesive layer (55) upon the fourth original liner (56). Removal and printing of the label is similar to embodiment number three with the exception being that the labels printed into three regions (35, 36, and 37) on the printable face sheet (41) are not removed. When use number one is made, the label region one (35) is printed upon. When use number two is made, label region number two (36) is printed upon and region label number one (35) is overprinted to indicate that portion is no longer effective, however, it is still readable. Similarly, in use number three, label number three (37) is printed upon and labeled number two (36) is overprinted but still readable. Progressive uses may be added by applying additional layers and dividing the printable face sheet (41) into additional regions.

All of the embodiments may be provided in a linerless form, wherein the original liners (56, 34, 7, 16) are omitted and a release agent is provided on top of the printable face sheets (41, 17, 1, 9).

Separability of the layers in the correct order is aided by manufacture and cutting as described in Intermec U.S. Patent Application "MULTI-PART PRESSURE SENSITIVE LABEL AND METHOD OF MANUFACTURE", invented by Ray Hatfield, filed Jun. 9, 2000, incorporated herein by reference.

The present invention is entitled to a range of equivalents, and is to be limited only by the scope of the following claims.

We claim:

1. A single multiple-use RFID label, comprising:

a layered construction of
   at least one face sheet,
   a transponder,
   at least one adhesive layer,
   at least one release layer, each of said release layers allows said RFID label to be separated into two parts.

* * * * *